United States Patent [19]

Muehlemann et al.

[11] Patent Number: 5,550,946
[45] Date of Patent: Aug. 27, 1996

[54] MODULAR FIBER OPTIC LIGHT LINE UNIT

[75] Inventors: Michael M. Muehlemann, Liverpool; J. Donald Noble, La Fayette, both of N.Y.

[73] Assignee: Illumination Technologies, Inc., East Syracuse, N.Y.

[21] Appl. No.: 519,394

[22] Filed: Aug. 25, 1995

[51] Int. Cl.⁶ ........................................ G02B 6/06
[52] U.S. Cl. .......................... 385/121; 385/120; 385/901; 362/32
[58] Field of Search ...................... 385/121, 120, 385/115, 116, 901; 362/32, 114

[56] References Cited

U.S. PATENT DOCUMENTS

| | | | |
|---|---|---|---|
| 3,038,959 | 6/1962 | Beurle | 178/7.2 |
| 3,192,843 | 7/1965 | Kapany et al. | 95/73 |
| 3,398,669 | 8/1968 | Hicks, Jr. | 95/73 |
| 3,512,961 | 5/1970 | Schackert | 350/96 |
| 3,610,726 | 10/1971 | Aijala | 350/96 B |
| 3,718,515 | 2/1973 | Goldstein | 156/174 |
| 3,909,109 | 9/1975 | Aurenz | 350/96 B |
| 3,950,074 | 4/1976 | Tanaka | 350/96 B |
| 4,153,333 | 5/1979 | Harada et al. | 350/96.25 |
| 4,154,500 | 5/1979 | Funato et al. | 350/96.25 |
| 4,462,662 | 7/1984 | Lama | 350/413 |
| 4,735,479 | 4/1988 | Nicholls | 350/96.2 |
| 4,911,526 | 3/1990 | Hsu et al. | 350/96.24 |
| 4,950,048 | 8/1990 | Kakii et al. | 350/96.2 |
| 4,952,022 | 8/1990 | Genovese | 350/96.24 |
| 4,991,930 | 2/1991 | Baek et al. | 350/96.24 |
| 5,032,718 | 7/1991 | Murakami | 250/227.2 |
| 5,367,440 | 11/1994 | Gruszczynski et al. | 385/120 X |
| 5,367,595 | 11/1994 | Jennings et al. | 385/71 |

Primary Examiner—John D. Lee
Assistant Examiner—Phan T. H. Palmer
Attorney, Agent, or Firm—Trapani & Molldrem

[57] ABSTRACT

A modular fiber optic light line unit provides a uniform linear beam of illumination. A number of these modular units can be butted together end to end to create a long, seamless line of uniform strip lighting. The unit has a housing in which a distal portion of the fiber optic bundle fans out so that the termini of the fibers are arrayed in a single continuous fiber row at a distal face plate of the housing. The ends of the row are flush with end edges of the distal face plate. In one embodiment the housing has first and second halves that sandwich the fiber termini, and there are respective sawtooth or similar recesses that each hold a respective fiber end or terminus. The housing can be anodized aluminum, and the optical fibers can be polymer fibers, for example with a diameter of 0.030 inches.

10 Claims, 1 Drawing Sheet

MODULAR FIBER OPTIC LIGHT LINE UNIT

BACKGROUND OF THE INVENTION

This invention relates to apparatus for illuminating an object and for providing a uniform, thin line of light onto an object for line scan applications. More specifically, the invention relates to light line units of modular design that can be butted end to end to provide very long, seamless lines of light. The invention is more particularly directed to an optical fiber based unit which can conduct light from a remote light source and convert the illumination from that source into a thin, long line of light.

Light line units are employed in a variety of applications where a long, narrow strip of light is needed. Light line units can be used in line-scan applications, e.g., with line-scan type CCD cameras in web-type applications The current preference for a light line unit employs a fluorescent robe and an elongated aperture to produce a line of light. The fluorescent tube light line units have difficulty producing a line of light that is uniform from one end of the line to the other, or a light that remains uniform over time. The fluorescent units have temperature-sensitive output fluctuations, and outputs that vary with age and with other conditions. Also, if two units are to be joined to provide a light line of extra length, there is additional illumination drop-off between modules.

Optical fibers have been used as line illuminators, and one example is described in U.S. Pat. No. 4,952,022 to Genovese. In the Genovese patent, the illuminating device is comprised of a bundle of large-diameter fibers, in which the distal ends or termini are deformed into a rectangular cross section. There, the idea was to produce a linear beam that is uniform along the output of the array. However, the patent does not address how to join two or more units to produce a very long linear beam with no drop-off or discontinuity from one modular unit to another. Another system for transmitting a linear beam of light from a lamp to a workpiece using optical fibers is described in U.S. Pat. No. 3,192,843 to Kapany et al. In the system of that patent, there are alternating layers of illuminating fibers and imaging fibers, and no provision for joining a number of units end-to-end for any reason In a number of industrial applications, it is necessary to provide a line of illumination up to several meters in length, and with uniformities of better than 10% in a transmission or reflective mode. A typical application can be automated quality inspection of a web type product that travels past, for example a fabric or carpet. The quality of the inspection depends entirely on the uniformity of the light source, that is, on uniformity across the light line. Such high uniformity has been difficult to achieve using standard techniques, such as apertured fluorescent lamps. In addition, inspection of heat-sensitive materials requires remoting the light source from the product, and this has been impossible with conventional linear light sources.

OBJECTS AND SUMMARY OF THE INVENTION

It is an object of the present invention to provide a modular light line unit, that is a modular linear light beam source, that produces a line of light that is uniform across its length and creates a seamless long light line when a number of such modular units are butted together.

It is another object to provide a simple, robust assembly in which a flexible fiber optic bundle carries illumination from a remote light source to the modular unit.

It is a further object to provide a light line with a significantly enhanced light output as compared with conventional linear light sources.

It is another object to provide a modular light line unit that can be routinely reconfigured to meet varying application needs, can accommodate specific working distance and environmental requirements, and can meet dimensional limitations.

According to an aspect of the invention, a modular fiber optic light line unit produces a thin, continuous line of illumination, and a number of these units can be joined together end to end to produce a long, seamless linear light beam. The units have a housing with a flat distal face member from which the line of light emanates, and a fiber optic bundle that is formed of a plurality of optical fibers. A sheath, e.g., a flexible vinyl tube contains the proximal end of the bundle that extends from the housing, and a coupling at the distal end connects to a light source. The proximal part of the fiber bundle is contained within the housing, and is fanned out so that the distal ends or termini of the fibers are arrayed in a single-thickness row of fibers that extends over the length of the distal face of the housing from a first end edge to a second end edge. The distal face member of the housing contains structure that holds the termini of the fibers in a continuous row to define the light line. In one preferred embodiment, the housing is formed of first and second halves that meet at this line with the optical fibers held in place therebetween. Each half has a facing row of serrations extending the entire length of the distal end, so that the row of fibers has its ends flush with the first and second end edges of the distal face member of the housing. In this fashion, when two or more modular units are butted together, there are no gaps in the combined rows of optical fibers, and the light line from the several units is presented as a continuous, seamless thin linear beam, without drop-out between units. The light line units can be used for white light, specific color light, infrared, or ultraviolet illumination.

The housing can be made of anodized aluminum, and the optical fibers can be polymer fibers, for example with a diameter of 0.030 inches.

The above and many other objects, features, and advantages of this invention will become apparent from the ensuing description of a preferred embodiment, which should be read in connection with the accompanying Drawing.

DETAILED DESCRIPTION OF THE PREFERRED EMBODIMENT

Figure 1:
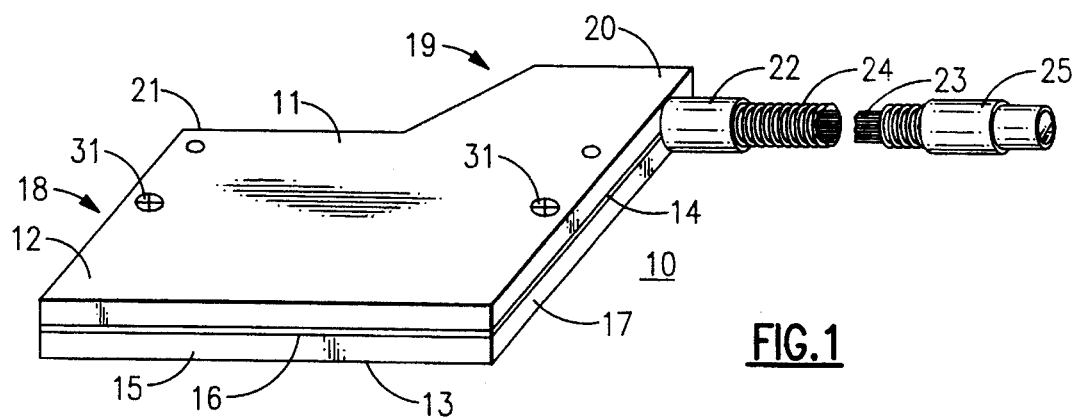
FIG. 1 is a perspective view of a modular light line unit according to one embodiment of this invention.

With reference to the Drawing, a modular light line unit 10 has a housing or casing 12 formed of a first housing half 12 and a second housing half 13. Here, the halves are preferably made of a cast anodized aluminum, although many other suitable materials exist. The halves fit together at a join line 14. At a lower or distal side of the housing is an elongated flat distal face plate 15, where the join line 14 defines a light line 16, and from the latter emanates the light line or linear beam of illumination. The housing 11 has a first side 17 at a right angle to the face plate 15 and an opposed second side 18 also at a right angle to the face plate 15. These sides 17, 18 rise to a stepped top or proximal side 19, such that the housing 11 has a shoulder 20 at the first side 17 and a recess 21 at the second side 18. A laterally protruding block 22 is formed at the shoulder 20 on the side 17 near the proximal wall 19, and a flexible fiber optic bundle 23 extends out of the housing from this block 22. A flexible vinyl tubular protective sheath 24 covers the proximal portion of the fiber optic bundle 23. Not shown here, a strain relief protects the fiber bundle as it enters the block 22. At the proximal end of the bundle 23 and sheath 24 is a coupler 25 that fits a mating receptacle in a standard light source (not shown). In a preferred embodiment, the bundle 23 is comprised of polymer optical fibers with a diameter of 0.030 inches. However, in other embodiments, glass fibers or other optical fibers could be used.

Figure 2:
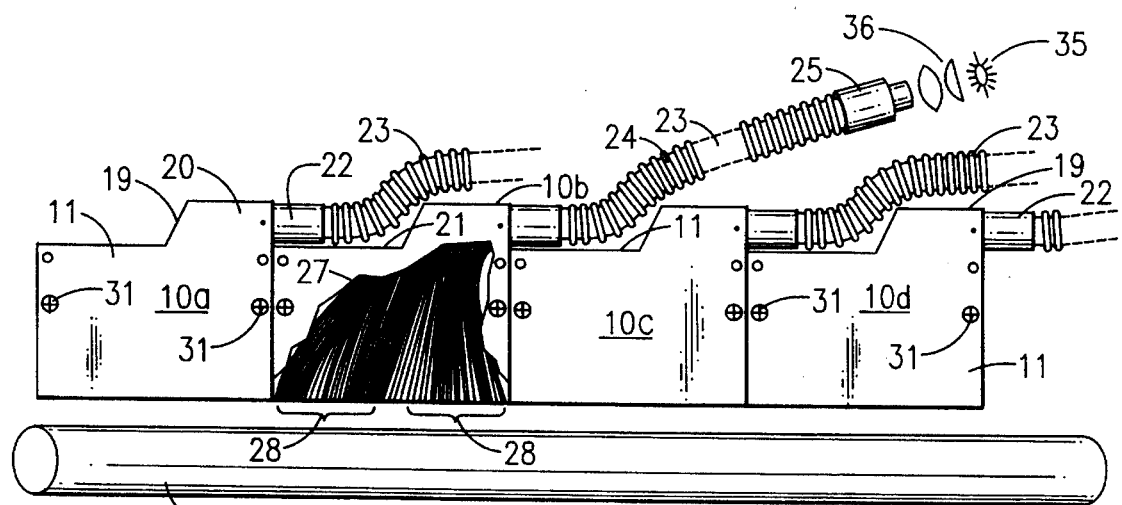
FIG. 2 is an elevational view showing an arrangement of a series of modular units of this for providing a long, seamless linear beam.

As shown in cutaway in FIG. 2, within the housing 11 a proximal portion 27 of the fiber optic bundle 23 fans out into a single layer, and ends or termini 28 of the optical fibers are arranged side-by-side into a single row to form the light line 16 on the face plate 15. Here, the ends of the row of optical fibers are flush with the end edges of the face plate 15 at the positions of the first and second sides 17 and 18. This permits a number of the modular units 10 to be joined end to end to form a single uninterrupted light line, as will be discussed shortly. Most favorably, each terminus 28 is configured and polished for optimal light distribution.

Figure 3:
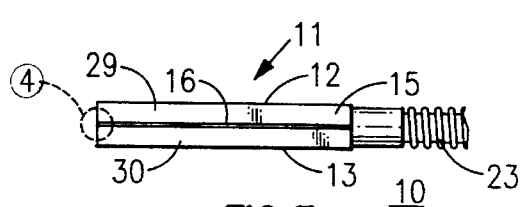
FIG. 3 is a plan view showing the distal face of the unit of this embodiment.
Figure 4:
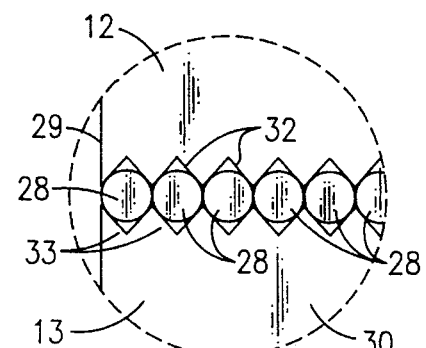
FIG. 4 is an enlargement of the area identified at ④ in FIG. 3.

As illustrated in FIGS. 3 and 4, the distal face plate 15 is formed in two parts that join together at the join line 14 with the optical fiber termini 28 sandwiched between them. On the upper housing half 12 is an upper half 29 of the face plate 15, and on the lower housing half 13 is a lower half 30 of the face plate. The termini 28 are clamped between the upper and lower halves 29, 30 when the housing halves 12, 13 are fastened together, e.g., with screws 31, 31 (FIGS. 1,2). In this embodiment, the halves 29, 30 have a sawtooth configuration at facing edges, with a series of sawtooth recesses 32 or serrations on the upper half 29 and a similar series of sawtooth recesses 33 on the lower half 30. Respective pairs 32 and 33 of the upper and lower sawtooth recesses each hold one optical fiber end or terminus. As shown in FIG. 4, an end terminus 34, here the left-most fiber, lies flush with the end edge of the face plate 15 at the second side 18 of the housing. A similar end fiber is disposed flust with the opposite end edge at the first side 17.

While in this embodiment, the recesses or serrations 32, 33 are of sawtooth shape, the same could be undular or crenellate in shape.

Referring again to FIG. 2, a series of modular units 10a, 10b, 10c, and 10d are shown butt-joined, with side 17 of one unit joined to side 18 of the next. More or fewer units 10 could be employed, depending on the application. Clamping structure, not shown here, can be employed as needed for a given application, and this would be within the capability of the user. Each unit 10 has its respective fiber bundle 23 associated with a suitable light source, with the coupler 25 fitted to the light source as appropriate. For the sake of illustration, a lamp 35 and collimator lens group 36 are shown schematically with respect to one of the units 10b. It is possible with suitable Y couplers to join more than one unit 10 to a given light source. The intensity of illumination can be controlled in known fashion using diaphragms or filters contained in the light sources.

Here, the shoulders 20 and recesses 21 permit the units to be coupled adjacent to one another, with the fiber bundles 23 tiding over the stepped proximal wall 19 of the next modular unit 10. With the units 10a to 10d butted together end to end as shown, the units together produce a single seamless, continuous line of light, with no gaps at the junctions of the units 10a to 10d.

Also shown in FIG. 2 is an optional cylindrical lens 37 disposed with its cylindrical axis across the linear beam of light. In many possible configurations, the lens 37 could be omitted, and in others another type of lens could be employed.

While the invention has been described with reference to a single preferred embodiment, it should be recognized that the invention is not limited to that precise embodiment. Rather, many modifications and variations will be apparent to persons skilled in the art without departing from the scope and spirit of this invention, as defined in the appended claims.

We claim:

1. Modular fiber optic light line unit for producing a thin, continuous line of illumination, comprising a housing having a distal face from which said line of illumination emanates, said distal face extending from a first end edge to a second end edge of said housing;

a fiber optic bundle formed of a plurality of optical fibers, said bundle including a proximal portion carried in a sheath, said proximal portion including means to receive light from a light source, and a distal portion disposed within said housing, with the optical fibers in said distal portion being fanned out to terminate in a flat linear array; and wherein said distal face of said housing includes means for holding distal termini of said optical fibers in a continuous row that extends the length of said distal face and such that ends of said row are flush with said first and second end edges, such that another similar modular fiber optic light line unit can be positioned abutting the first-mentioned module to form a single uninterrupted light line.

2. The modular fiber optic light line unit of claim 1, wherein said housing includes first and second housing portions that fit together at a line on said distal face that defines said continuous row.

3. The modular fiber optic light line unit of claim 1, wherein said housing is formed of anodized aluminum.

4. The modular fiber optic light line unit of claim 1, wherein said optical fibers are polymer fibers.

5. The modular fiber optic light line unit of claim 4, wherein said fibers are on the order of 0.030 inches in diameter.

6. Modular fiber optic light line unit for producing a thin, continuous line of illumination, comprising a housing having a distal face from which said line of illumination emanates, said distal face extending from a first end edge to a second end edge of said housing; and a fiber optic bundle formed of a plurality of optical fibers, said bundle including a proximal portion carried in a sheath, said proximal portion including means to receive light from a light source, and a distal portion disposed within said housing, with the optical fibers in said distal portion being fanned out to terminate in a flat linear array;

wherein said distal face of said housing includes means for holding distal termini of said optical fibers in a continuous row that extends the length of said distal face and such that ends of said row are flush with said first and second end housing includes first and second housing portions that fit together at a line on said distal face that defines said continuous row, and wherein said means in said distal face includes respective rows of serrations facing one another in said first and second housing parts along said line on said distal face.

7. The modular fiber optic light line unit of claim 6, wherein said housing distal face is an elongated flat wall and said housing has first and second end walls at right angles to said distal face and defining said first and second end edges, such that a plurality of said modular fiber optic light line units can be joined end to end to produce a single continuous line of illumination.

8. The modular fiber optic light line unit of claim 4, wherein said housing has a proximal wall with a shoulder formed at said first end wall from which the proximal portion of said fiber optic bundle extends, and a recess formed at said second wall to accommodate a fiber optic bundle extending from an adjacent modular fiber optic light line unit.

9. A linear illuminating arrangement formed of a plurality of modular fiber optic light line units for producing a thin, continuous line of illumination, each said modular light line unit comprising a housing having a distal face from which said line of illumination emanates, said distal face extending from a first end edge to a second end edge of said housing; and a fiber optic bundle formed of a plurality of optical fibers, said bundle including a proximal portion carried in a sheath, said proximal portion including means to receive light from a light source, and a distal portion disposed within said housing, with the optical fibers in said distal portion being fanned out to terminate in a flat linear array;

wherein said distal face of said housing includes means for holding distal termini of said optical fibers in a continuous row that extends the length of said distal face and such that ends of said row are flush with said first and second end edges;

said modular light line units abutting one another so that the first end edge of one modular light line unit is flush with the second end edge of an adjacent light line unit.

10. The linear illuminating arrangement of claim 9, in which the flat arrays of the optical fibers of successive said modular light line units abut one another to form a continuous row of fibers with no gaps at locations at which the modular light line units abut one another.

* * * * *

UNITED STATES PATENT AND TRADEMARK OFFICE
CERTIFICATE OF CORRECTION

PATENT NO. : 5,550,946
DATED : August 27, 1996
INVENTOR(S) : Michael M. Muehlemann It is certified that error appears in the above-indentified patent and that said Letters Patent is hereby corrected as shown below:

Column 1, line 19
  "robe" should read --tube--
Column 2, line 56
  After "modular units of this" please insert --invention--
Column 4, line 6
  "tiding" should read --riding--
Column 5, line 5
  After "second end" please insert --edges, wherein said--

Signed and Sealed this

Twelfth Day of November, 1996

Attest:

Attesting Officer

BRUCE LEHMAN
Commissioner of Patents and Trademarks